United States Patent [19]

Paul

[11] 4,271,611
[45] Jun. 9, 1981

[54] TRACTOR-MOUNTED LATERALLY UNDERCUTTING TRANSPLANT DIGGING MACHINE

[76] Inventor: William F. Paul, 2200 Sangamon Ave. E., Springfield, Ill. 62702

[21] Appl. No.: 74,094

[22] Filed: Sep. 10, 1979

[51] Int. Cl.³ ............................................. A01G 23/02
[52] U.S. Cl. ...................................... 37/2 R; 171/62; 172/698
[58] Field of Search ................. 37/2 R, 92, 2; 172/19, 172/20, 698, 5, 6; 171/50, 62; 47/73, 76, 1.43

[56] References Cited

U.S. PATENT DOCUMENTS

| | | | |
|---|---|---|---|
| 1,198,338 | 9/1916 | Frakes | 47/73 X |
| 2,770,076 | 11/1956 | Kluckhohn | 47/58 |
| 2,779,111 | 1/1957 | Cartwright | 37/2 R |
| 3,193,951 | 7/1965 | Beeson | 37/2 R |
| 3,512,276 | 5/1970 | Juhl | 172/698 X |
| 3,558,177 | 1/1971 | Snead | 37/2 R |
| 3,623,245 | 11/1971 | Adams | 37/2 R |

FOREIGN PATENT DOCUMENTS 1045290 10/1966 United Kingdom ......................... 37/2

Primary Examiner—James R. Feyrer
Attorney, Agent, or Firm—Ralph F. Staubly

[57] ABSTRACT

A commercially available four-wheel-drive loader has a conventional "quick-attachment" front plate liftable by operator-controllable hydraulic-cylinder means; and it has the transplant digging machine easily detachably mounted on said front plate for movement between rows of trees, etc., to a position laterally opposite one selected for transplanting (or root pruning). The transplant digging machine has a U-shaped undercutting blade mounted for downwardly swinging ground-penetrating movement and then horizontal root-cutting movement, by separate sequentially operable hydraulic cylinders. The first cylinder swings a slide-in-guide carrier for the blade through an arc from a downward inclination to a horizontal orientation. The second cylinder is in the carrier, and is operated to force the blade horizontally under the root "ball" being cut. Two vertically operated flat blades, oriented perpendicularly to the direction of the U-shaped-blade movement, serve both as earth anchors to neutralize reactive lateral thrust from the U-shaped blade and also to sever roots by along-row loader movements.

4 Claims, 3 Drawing Figures

TRACTOR-MOUNTED LATERALLY UNDERCUTTING TRANSPLANT DIGGING MACHINE

BACKGROUND AND OBJECTS OF THE INVENTION

Transplant digging machines of the prior art (e.g. Juhl, U.S. Pat. No. 3,512,276, May 19, 1970) can operate only at the front or rear of, and longitudinally from, a tractor or the like, and thus they cannot dig-up a tree or shrub which is medially located in an inner row without damaging closely adjacent trees if the tractor were angled as would be needed for the operation. It is accordingly the principal object of this invention to provide a front- or rear-mountable transplant digging machine or root-pruner (for mounting on conventional power-operated vehicles) which is laterally operable with the vehicle positioned between and oriented parallel to closely spaced rows of trees or shrubs. A further object is to provide such a transplant digging machine with at least one row-paralleling blade to serve as a thrust-neutralizing anchor and/or as an along-row root-cutter. Other objects and advantages will become apparent as the following detailed description proceeds.

BRIEF DESCRIPTIONS OF THE DRAWING FIGURES

DETAILED DESCRIPTION

Figure 1:
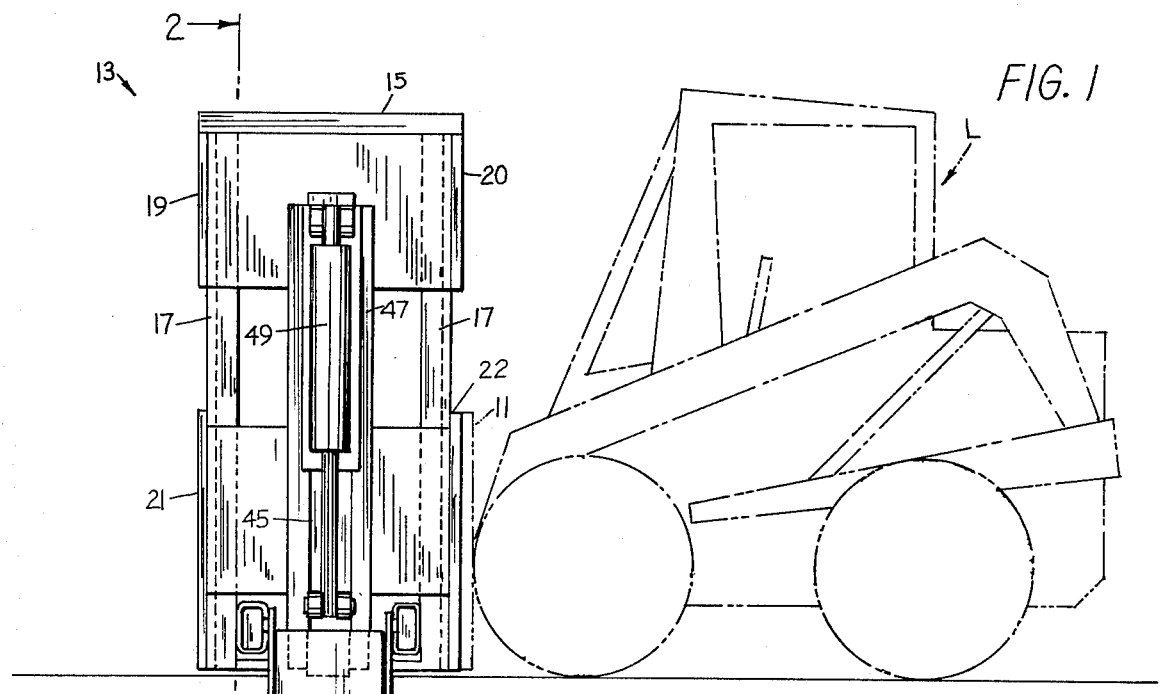
FIG. 1 is a row-side elevational view of a preferred embodiment of the invention with its U-shaped blade lowered.
Figure 3:
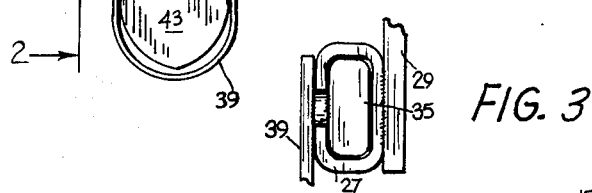
FIG. 3 is an enlarged fragmentary elevational view of that part of the disclosure of FIG. 1 immediately adjacent the upper right corner of part 43.

With reference now to the drawings, the letter L designates a commercially available four-wheel-drive loader having a "quick-attachment" plate 11 vertically movable by conventional hydraulic-cylinder-controlled linkage elements (not shown). The transplant digging machine 13 is easily detachably mounted by any suitable means on the plate 11.

The transplant digging machine 13 is shown as having a top plate 15 and angle-bar corner posts 17 rigidly fixed thereto. Rigidifying side plates 19, 20, 21, 22 and end plates 23, 24, 25 and 26 complete the basic frame.

Two trough-shaped members 27 (FIG. 2) are swingably mounted in the frame on arms 29 fixed at right-angles to the lower end of the members 27 and pivoted to the frame at 31. Hydraulic cylinder 33 swings the members 27 between their full-line and phantom-line positions of FIG. 2.

The trough-shaped members 27 serve as guides for slide members 35 held therein and extendable therefrom by hydraulic cylinder 37. A U-shaped under-cutting blade 39 is fixed to the forward ends of the slide members 35. In operation the cylinder 33 is first actuated to force the blade 39 down into the ground to its left phantom-shown position of FIG. 2. Then the cylinder 37 is actuated to undercut the root "ball" B of the tree T as the blade 39 moves thereunder to its right phantom-shown position.

Figure 2:
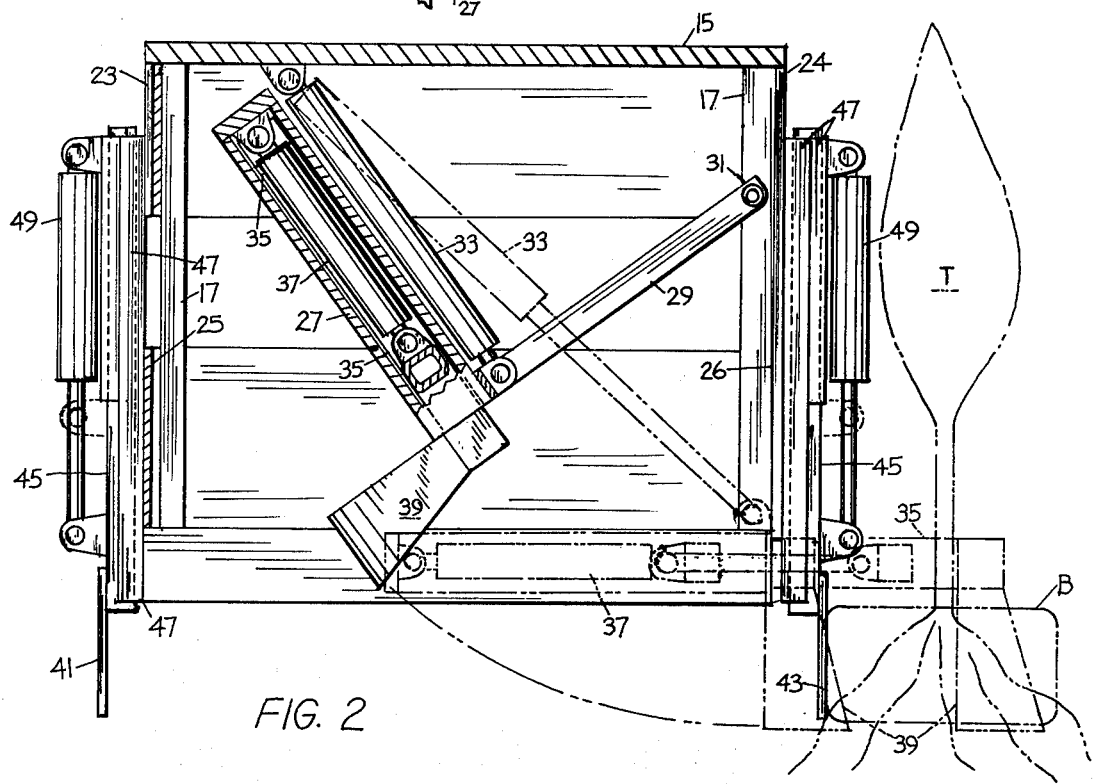
FIG. 2 is a front elevational view of the device of FIG. 1 in section taken on the line 2—2 of FIG. 1 with its U-shaped blade shown in full lines in raised position.

FIG. 2 shows two vertically movable blades 41 and 43 which can be lowered and used to cut roots, in paths parallel to tree rows, by forward movement of the loader. The blades 41 and 43 are mounted on slides 45 held in guides 47 and vertically moved by hydraulic cylinders 49. The blade(s) 41 and/or 43 also serve(s) the important function of acting as earth anchors to neutralize the lateral thrust of the blade 39 as it under-cuts the tree ball B. The blade 43 additionally would act to free the root ball B from the blade 39 after the ball is lifted from the ground (and underlain by a burlap bag-forming sheet) as the blade is withdrawn thereunder.

Having thus described my invention, what I claim is:

1. A between-row-movable and laterally-undercutting transplant digging machine comprising: a fore-aft-narrow frame adapted for mounting across the front or rear end of, and on the conventional accessory-attachment-receiving lift means of, a power-operated vehicle; a U-shaped under-cutter blade mounted in a rectilinear movable slide means; a guide means for said slide means; hydraulic-cylinder means for soil-penetratingly moving said blade by moving said slide means; pivotal means for swingably attaching said guide means to said frame; and hydraulic-cylinder means for swinging said guide means and thereby said blade downwardly and laterally into position for horizontal under-cutting blade movement by said first-mentioned hydraulic-cylinder means.

2. A transplant digging machine according to claim 1 and further comprising at least one row-paralleling blade vertically guidedly lowerable into soil-penetrating position to serve as a root-cutter by fore-aft loader movement and/or as an earth anchor to neutralize reactive thrust produced by lateral under-cutting movement of said U-shaped blade.

3. A transplant digging machine according to claim 2 and further comprising hydraulic-cylinder means for effecting the vertical movement of said row-paralleling blade.

4. A transplanter digging machine according to claim 1 wherein said row-paralleling blade substantially corresponds to the shape of and fits within the cross-sectional area defined by said U-shaped blade, whereby when an earth core is cut by said U-shaped blade and after a freed root-ball has been lifted by and on said U-shaped blade and a bagging sheet has been laid thereunder, said row-paralleling blade can serve to maintain the horizontal position of said root-ball as said U-shaped blade is withdrawn.

* * * * *